United States Patent [19]

Rasmussen et al.

[11] 4,192,455
[45] Mar. 11, 1980

[54] APPARATUS FOR CONTROLLING THE SUPPLY TEMPERATURE IN A CENTRAL HEATING INSTALLATION

[75] Inventors: Hans C. Rasmussen, Sonderborg; Knud J. Hallgreen, Nordborg, both of Denmark.

[73] Assignee: Danfoss A/S, Nordborg, Denmark

[21] Appl. No.: 892,075

[22] Filed: Mar. 31, 1978

[30] Foreign Application Priority Data

Apr. 1, 1977 [DE] Fed. Rep. of Germany ....... 2714511

[51] Int. Cl.$^2$ ............................................... F24D 3/00
[52] U.S. Cl. ..................................... 237/8 R; 165/22; 236/1 B; 236/78 C
[58] Field of Search .......................... 237/8 R, 8 C, 62; 165/22; 236/1 B, 78 C

[56] References Cited

U.S. PATENT DOCUMENTS

| | | | |
|---|---|---|---|
| 3,421,691 | 1/1969 | Forbes | 237/8 R |
| 3,567,115 | 12/1970 | Nelson | 165/22 |
| 3,770,197 | 11/1973 | Meier | 237/8 C |

Primary Examiner—William E. Wayner
Attorney, Agent, or Firm—Wayne B. Easton

[57] ABSTRACT

The invention relates to thermostatic apparatus for controlling the heating fluid supply temperature in a central heating installation having at least two radiators in different rooms. With each room having a thermostat for controlling the radiators therein, the apparatus operates so that the most active thermostat is given priority in controlling the temperature of the heating fluid.

7 Claims, 4 Drawing Figures

APPARATUS FOR CONTROLLING THE SUPPLY TEMPERATURE IN A CENTRAL HEATING INSTALLATION

The invention relates to an apparatus for controlling the supply temperature in a central heating installation, comprising at least two radiators arranged in different rooms and associated valves each controllable by a thermostat, with the use of a control circuit for actuating a servo-member, particularly a mixing valve controlled by a servo-motor.

When a central heating installation of which the radiators are independently controlled by thermostatic valves is operated with a constant supply temperature, considerable heat losses occur because the supply temperature is much too high during the longest period. This is also the case when the supply temperature is variable by means of a manually adjustable mixing valve with which the supply temperature is adapted to the seasons.

It is also already known to control the supply temperature as a function of the outside temperature. This permits the supply temperature to be more readily adapted to the expected heat requirement. Nevertheless, an unnecessarily high supply temperature must be set for many conditions because it must be set so that a room will be adequately heated even under extreme conditions (north side, north wind, set desired value of 25° C.).

The invention is based on the problem of providing an apparatus of the aforementioned kind with which the supply temperature can be kept as low as possible but will still be adequate for a particular heat requirement.

This problem is solved according to the invention by signal circuits which produce heat demand signals in response to the control departure of each thermostat, and by a first comparator circuit giving a rise signal influencing the control circuit in the sense of increasing the supply temperature for as long as the control departure associated with one of the heat demand signals is larger than a predetermined first limiting value.

With this apparatus, the supply temperature is in each case controlled in response to the room having the highest heat requirement. As a measure for the heat requirement, one utilises the control departure between the desired value and the existing value of room temperature. This parameter is available at a thermostat without additional expedients. If the first limiting value of the control departure is exceeded in one or more rooms, the supply temperature is increased until the control departure is sufficiently small even in the room having the highest heat requirement.

Downward control of the supply temperature can be effected in various ways. It can, for example, be initiated and terminated at predetermined time intervals when the first rise signal occurs. A particularly rapid adaptation to a drop in heat requirement is, however, achieved by signal circuits which produce excess heat signals in response to the control departure of each thermostat, by a second comparator circuit giving a drop signal influencing the control circuit in the sense of reducing the supply temperature for as long as the control departure associated with one of the excess heat signals is larger than a predetermined second limiting value, and by a blocking device which renders the drop signal inoperative on the occurrence of the rise signal. The downward control therefore corresponds to the upward control; it is however dominated by the upward control.

The first or second comparator circuit may comprise a separate comparator for each signal circuit, their outputs being connected in parallel. However, in general it is sufficient if the first or second comparator circuit comprises a comparator common to all associated signal circuits, and an associated limiting value generator. This results in a particularly simple construction.

In this connection it is desirable for the signal circuits to be connected by diodes to the common comparator circuits. These diodes then serve as blocking diodes.

When using two-point thermostatic switches, it is advisable for each signal circuit to comprise an RC time element with a condenser chargeable through the thermostatic switch, and for the voltage at the condenser to serve as a heat demand and excess heat signal and to be compared with a limiting voltage in the comparator circuit. In this case use is made of the sequence ratio or the length of the switching on and switching off period to determine the control departure. By comparing the condenser voltages with the limiting voltage it can be determined very accurately whether a predetermined switching-on or switching-off period has been exceeded. This circuit also permits a plurality of time-displaced charging and discharging operations to be evaluated and nevertheless allow those thermostats to become effective for the control of the supply temperature of which the sequence ratio lies beyond the predetermined data.

It is also favourable if the thermostatic switch applies a voltage to the servo-member of the associated valve and, when using AC voltage by way of a rectifier arrangement, to an RC parallel combination and an RC series combination.

The parallel combination results in a decrease in condenser voltage during the switching off period and the series combination results in a rise in condenser voltage during the switching on period, these being evaluated with regard to time with the aid of the limiting voltage.

When using an analogue thermostat, it is advisable that an output voltage corresponding to the control departure serves as heat demand or excess heat signal and is compared with a limiting voltage in the comparator circuit. Since the control departure is available as an analogue signal in an analogue thermostat, it can be utilised either directly or after amplification.

The analogue thermostat advantageously comprises a bridge circuit having a temperature responsive sensing resistor in one branch and a desired value resistor in another branch, and a bridge amplifier which is fed by the diagonal voltage and the output voltage of which controls the servo-member of the associated valve by way of a working amplifier and feeds a respective input of the first and second comparator circuit. Since the control departure can be positive or negative, it can be fed to the inputs of both comparator circuits.

In a further development of the invention it is ensured that, when the heat demand signal or excess heat signal exceeds the limiting value, the comparator circuit switches from a constant first output signal to the constant rise or drop signal and the latter each operate a rise or drop relay, and that the servo-motor comprises a rise control circuit and a drop control circuit which can be selectively applied to a control voltage by a reversing contact of the rise relay, an operating contact of the drop relay being diposed in the drop control circuit as blocking device. This results in simple comparators and a simple control device for the servo-motor.

The control voltage may be formed by pulses of adjustable frequency. In this way on obtains a slow adjustment of the servo-motor which can in addition be adapted to the local requirements.

The invention will now be described in more detail with reference to examples illustrated in the drawing, wherein.

Figure 1:
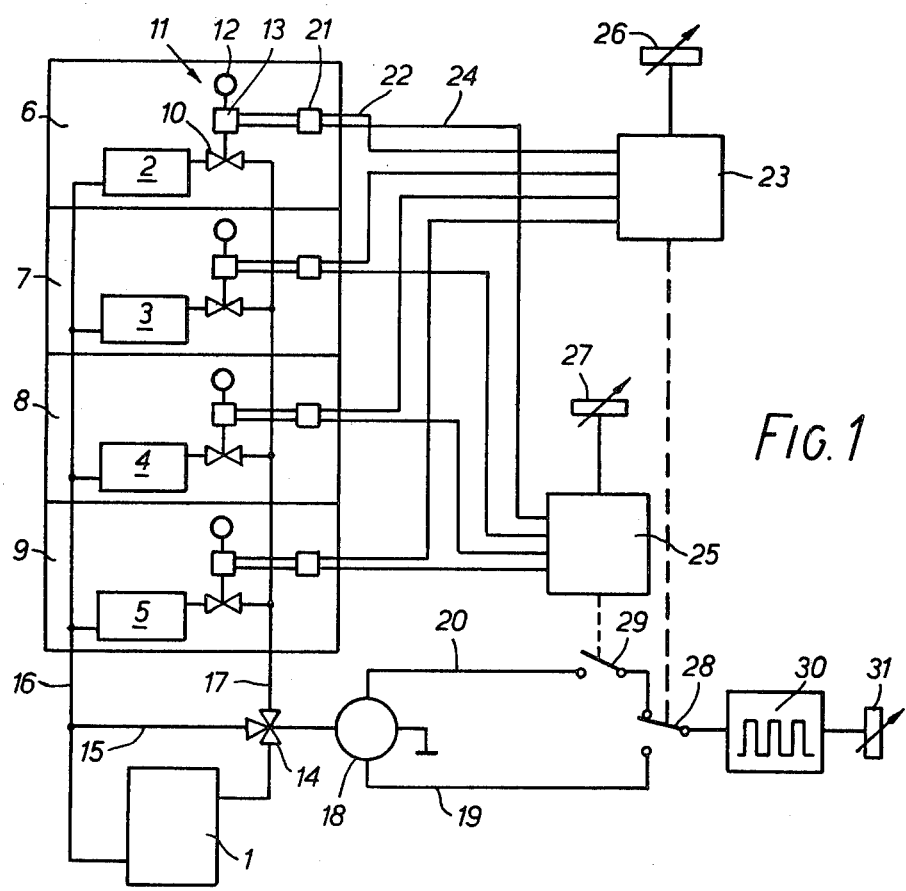
FIG. 1 is a diagrammatic representation of the apparatus according to the invention.

The central heating installation shown in FIG. 1 comprises a boiler 1 and a plurality of radiators 2, 3, 4 and 5 each serving for the independent heating of rooms 6, 7, 8 and 9. Each radiator is associated with a valve 10 which is controllable by means of a thermostat 11. The latter comprises a sensor 12 and a servo-member 13 for the valve. The supply temperature is variable with the aid of a mixing valve 14 which, by way of a connecting conduit 15, admixes cool water from the return conduit 16 to the warm water in the supply conduit 17. This mixing valve is adjusted with the aid of a motor 18 in the sense of a higher supply temperature when a voltage occurs in a rise control circuit 19 and in the sense of reducing the supply temperature when a voltage occurs in a drop control circuit 20.

Each thermostat 11 is associated with a signal circuit arrangement 21 from which a line 22 for the rise signals leads to a comparator circuit 23 and a line 24 for the drop signals leads to a comparator circuit 25. Both comparator circuits each comprise a limiting value generator 26 or 27 which is adjustable. When at least one of the drop or rise signals exceeds the set limiting value, the appropriate comparator circuit responds. A reversing contact 28 is actuated in the one case and a working contact 29 in the other case. A pulse generator 30 of which the pulse frequency can be adapted to the conditions by means of a setting device 31 makes voltage pulses available. If the reversing contact 28 responds, the rise control circuit 19 is energised and the mixing valve 14 is adjusted in the sense of increasing the supply temperature. If the working contact 29 responds, the pulses are fed to the drop control circuit 20 so that the supply temperature is reduced. However, control by the reversing contact 28 predominates.

Figure 2:
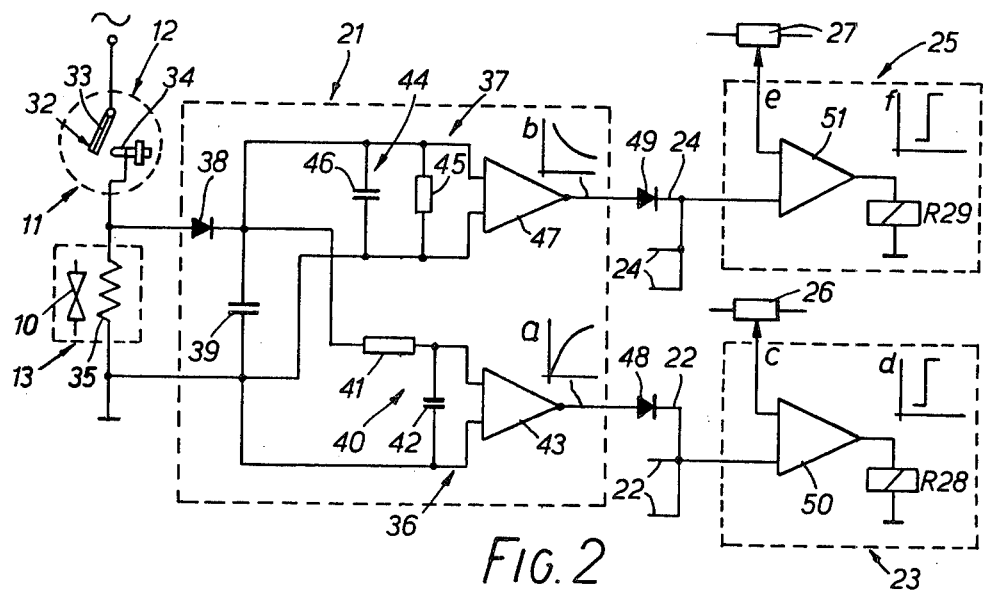
FIG. 2 is a simplified circuit diagram of the essential components of one embodiment.

FIG. 2 shows that the sensor is formed by a two-point thermostatic switch 32 comprising a bimetal 33 and a fixed contact 34 which can be displaced to set the desired value. This thermostatic switch 32 lies in series with a heating coil 35 which heats an expansible material in the setting member 13 for the valve 10. This series circuit is energised by AC voltage, e.g. 24 V. The thermostatic switch 32 opens when the desired value temperature is exceeded and closes if the desired value temperature is not reached.

In the signal circuit arrangement 21 there is a first signal circuit 36 and a second signal circuit 37. Both are energised by the said AC voltage by way of a diode 38 and a smoothing condenser 39 when the thermostatic switch 32 is closed. The first signal circuit has a time element in the form of an RC series combination 40 consisting of a resistor 41 and a condenser 42. The voltage at the condenser is applied to an amplifier 43 at the output of which a heat demand signal a occurs. This signal arises on closure of the thermostatic switch 32 and corresponds to the usual condenser charging curve. The second signal circuit 37 has a time element in the form of an RC parallel combination 44 consisting of a resistor 45 and a condenser 46. The condenser voltage is applied to an amplifier 47 at the output of which an excess heat signal b occurs. The latter is always present when the thermostatic switch 32 is open; it follows the typical course of a condenser discharging curve. In both output lines 22 and 24 there are blocking diodes 48 and 49 respectively.

The lines 22 of all the first signal circuits 36 are interconnected and are led to the one input of a comparator 50 in the comparator circuit 23. At the other input there is a limiting voltage c which is tapped from the limiting value generator 26. The comparator produces a small output signal for as long as the heat demand signal a is less than the limiting voltage c and suddenly produces a larger rise signal d when this limiting value is exceeded. This rise signal, possibly after being amplified further, energises a relay R 28 which actuates the reversing contact 28. Similarly, the lines 24 of all the second signal circuits 37 are together led to one input of a comparator 51 in the comparator circuit 25, a limiting voltage e tapped from the limiting value generator 27 being applied to the other input. A small output voltage is produced as long as the excess heat signal b is larger than the limiting voltage e. A drop signal f is given suddenly when this limiting value is passed in the downward direction. This drop signal, possibly after being amplified, energises a relay R 29 which actuates the working contact 29.

Figure 3:
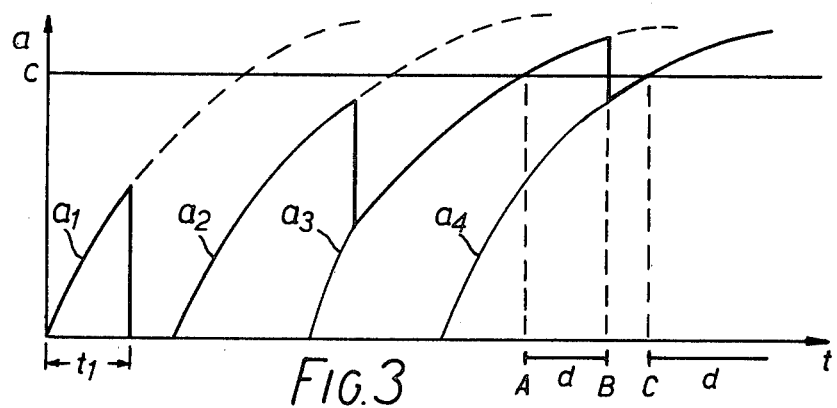
FIG. 3 is a time diagram showing the heat demand signals to be fed to a compartor.

This results in the following manner of operation which will hereinafter be explained with reference to FIG. 3 in connection with the heat demand signals a. The four rooms each produce a heat demand signal a1, a2, a3 and a4 which do not coincide in time. The period of each signal corresponds to the time during which the thermostatic switch is switched on, i.e. t1 for the signal a1. By reason of the blocking diodes 48, the largest particular heat demand signal reaches the comparator 50. The curve shown as a heavier full line therefore occurs at the comparator input. This exceeds the limiting voltage between the instances A and B as well as after the instant C. During these times the rise signal d is delivered by the comparator 50. Since a long switching-on period for the thermostatic switch 32 means that a lot of heat has to be supplied to the room, it is therefore ensured that by increasing the supply temperature there will be adaptation to the heat requirement of the most strongly loaded room. In this way the supply temperature is set no higher than is warranted by the heat requirement of this room.

The drop signals f are produced in a similar manner. They ensure that, if the supply temperature for the heat requirement is too high in a few rooms, there will be a repeated attempt at reducing the supply temperature until a rise signal occurs again for actuating the reversing switch 28. This means that the supply temperature is very accurately adapted to the instantaneous heat requirement of the most strongly loaded room.

Figure 4:
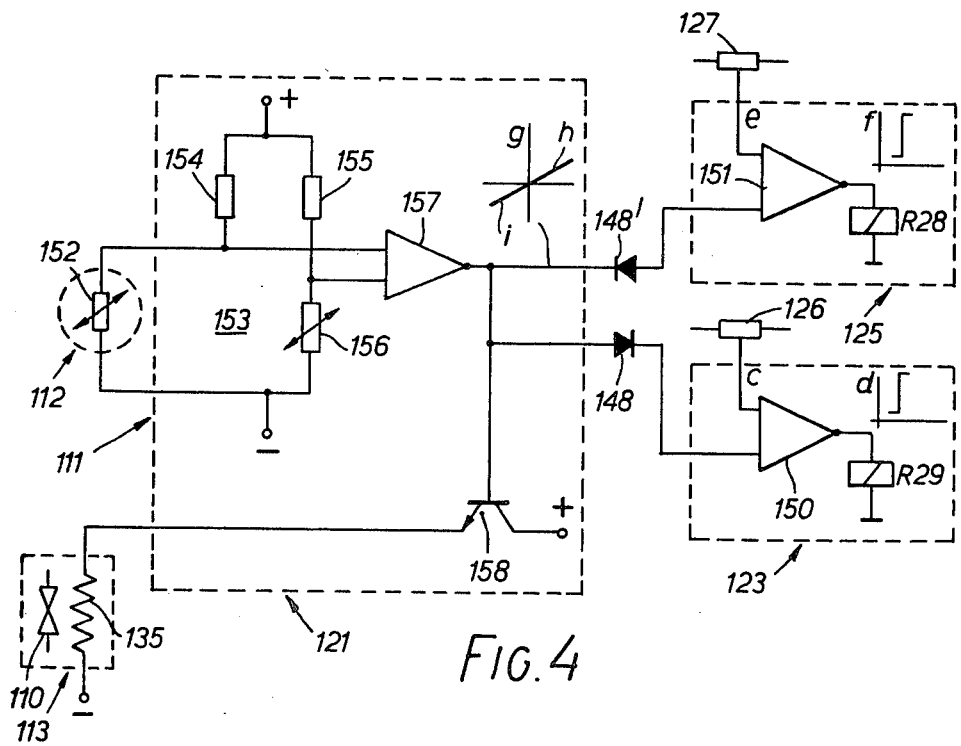
FIG. 4 is a simplified circuit diagram showing the important components of another embodiment.

In the FIG. 4 embodiment, corresponding parts are designated by the same reference numerals as in FIGS. 1 and 2 but increased by 100.

The thermostat 111 is an analogue thermostat combined with the signal circuit arrangement 121. The sensor 112 is a temperature responsive resistor 152 which is part of a bridge circuit 153 also comprising the resistors 154, 155 and an adjustable desired value resistor 156. The diagonal voltage is amplified in an amplifier 157 which gives an analogue output signal g corresponding to the control departure. This output signal is amplified in a transistor 158 and used to heat the heating resistor 135 of the servo-member 113 for the valve 110. The same output signal g serves as a heat demand signal h in the positive range and as an excess heat signal i in the negative range.

The comparator circuits 123 and 125 correspond to those in FIG. 2. They each contain a comparator 150 and 151 which actuates a relay by means of a surge signal. Their one input is applied to a limiting voltage. The other input is energised by way of a diode 148 by the rise signals h or by way of an oppositely poled diode 148' by the drop signals i. As soon as these signals which each correspond to a particular control departure exceed or fall below the associated limiting voltages, rise or drop signals, respectively, occur in the same way as in FIG. 2.

We claim:

1. Apparatus for controlling the heating fluid temperature in a central heating installation having at least two radiators arranged in different rooms and associated valves comprising, a thermostat assembly for each room including a thermostat having an output with first and second output signals corresponding to demand and satisfied conditions, said assembly including valve means controlled by said thermostat having open and closed states corresponding to said first and second output signals, said assembly including amplifier means connected to said thermostat output, said amplifier means having input network means which generates a rising voltage pursuant to said thermostat demand condition, comparator means connected to all of said amplifier means, said comparator means having an upper control limit for actuating said comparator means when said limit is exceeded, cool and warm sources of fluid and a connecting mixing valve, a servomotor for said mixing valve, first and second second circuit means for respectively rotating said servomotor in heating and cooling directions, first and second control means for said first and second circuits, said first control means being responsive to said comparator means, said first control means having priority over said second control means.

2. Apparatus according to claim 1 wherein said input network means generates a falling voltage corresponding to said thermostat satisfied condition, said comparator means having a lower control limit for oppositely actuating said comparator means when said lower control limit is exceeded, said second control means being responsive to said comparator means when said lower control limit is exceeded.

3. Apparatus according to claim 1 wherein said amplifier means includes first and second amplifiers, said input network means including first and second input networks for said first and second amplifiers, said networks respectively generating exponentially rising and falling voltages pursuant to said thermostat demand and satisfied conditions.

4. Apparatus according to cliam 3 having diode means connecting said amplifier means to said comparator means.

5. Apparatus according to claim 3 wherein said first and second input networks include RC circuits.

6. Apparatus according to claim 2 wherein said input network means includes a bridge circuit with said thermostat including a temperature responsive resistance element in one branch thereof.

7. Apparatus according to claim 2 including oppositely poled diode means connecting said amplifier means to said comparator means.

* * * * *